US012659302B2

(12) United States Patent
Ahmed et al.

(10) Patent No.: US 12,659,302 B2
(45) Date of Patent: Jun. 16, 2026

(54) ENTERPRISE SUBSCRIPTION MANAGEMENT

(71) Applicant: Telefonaktiebolaget LM Ericsson (publ), Stockholm (SE)

(72) Inventors: Abu Shohel Ahmed, Espoo (FI); Peter Robert Khello, Norsborg (SE); George Zhou, Guangzhou (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 184 days.

(21) Appl. No.: 18/260,489

(22) PCT Filed: Nov. 22, 2021

(86) PCT No.: PCT/EP2021/082555
§ 371 (c)(1),
(2) Date: Jul. 6, 2023

(87) PCT Pub. No.: WO2022/152436
PCT Pub. Date: Jul. 21, 2022

(65) Prior Publication Data
US 2024/0064133 A1 Feb. 22, 2024

(30) Foreign Application Priority Data
Jan. 13, 2021 (WO) ................ PCT/CN2021/071363

(51) Int. Cl.
*H04L 9/40* (2022.01)
*H04L 67/30* (2022.01)

(52) U.S. Cl.
CPC .............. *H04L 63/08* (2013.01); *H04L 67/30* (2013.01)

(58) Field of Classification Search
CPC ......... H04L 63/08; H04L 67/30; H04L 63/20; H04L 63/102; H04W 8/18; H04W 12/08;
(Continued)

(56) References Cited

U.S. PATENT DOCUMENTS

2003/0167336 A1* 9/2003 Iwamoto ............... H04L 63/102
710/36
2009/0254392 A1* 10/2009 Zander ................... H04L 63/20
705/50
(Continued)

OTHER PUBLICATIONS

"RSP Technical Specification", Version 2.2.1, GSM Association, Official Document SGP .22, Non-confidential, Dec. 18, 2018, pp. 1-250.

*Primary Examiner* — Nicholas R Taylor
*Assistant Examiner* — Tania M Pena-Santana
(74) *Attorney, Agent, or Firm* — Murphy, Bilak & Homiller, PLLC

(57) ABSTRACT

An enterprise entitlement server is deployed on an enterprise communication platform. The enterprise entitlement server retrieves authorization data from an authorization server controlled by an enterprise. The authorization data indicates to which one or more resources a subject of the enterprise is entitled to subscribe and/or indicates which one or more types of subscription management actions the subject is authorized to perform. The enterprise entitlement server controls management of a subscription for the subject in accordance with the authorization data.

20 Claims, 12 Drawing Sheets

(58) Field of Classification Search
     CPC ..... H04W 12/35; H04W 12/37; H04W 12/40;
                  H04W 4/50; H04W 8/20; H04W 4/60
     See application file for complete search history.

(56) References Cited

U.S. PATENT DOCUMENTS

| | | | |
|---|---|---|---|
| 2010/0131973 A1 | 5/2010 | Dillon et al. | |
| 2016/0087956 A1* | 3/2016 | Maheshwari | H04W 4/08 |
| | | | 726/6 |
| 2018/0170363 A1* | 6/2018 | Styles | G07C 5/0825 |
| 2018/0270363 A1* | 9/2018 | Guday | H04M 15/8083 |
| 2019/0037335 A1* | 1/2019 | Steck | H04W 8/186 |
| 2024/0089243 A1* | 3/2024 | Economy | H04L 63/105 |

\* cited by examiner

RETRIEVING AUTHORIZATION DATA FROM AN AUTHORIZATION
SERVER CONTROLLED BY AN ENTERPRISE
100

CONTROLLING MANAGEMENT OF A SUBSCRIPTION FOR THE
SUBJECT IN ACCORDANCE WITH THE AUTHORIZATION DATA
110

CONTROLLING PROVISIONING OF ONE OR MORE RESOURCES TO
WHICH THE SUBJECT IS ENTITLED
120

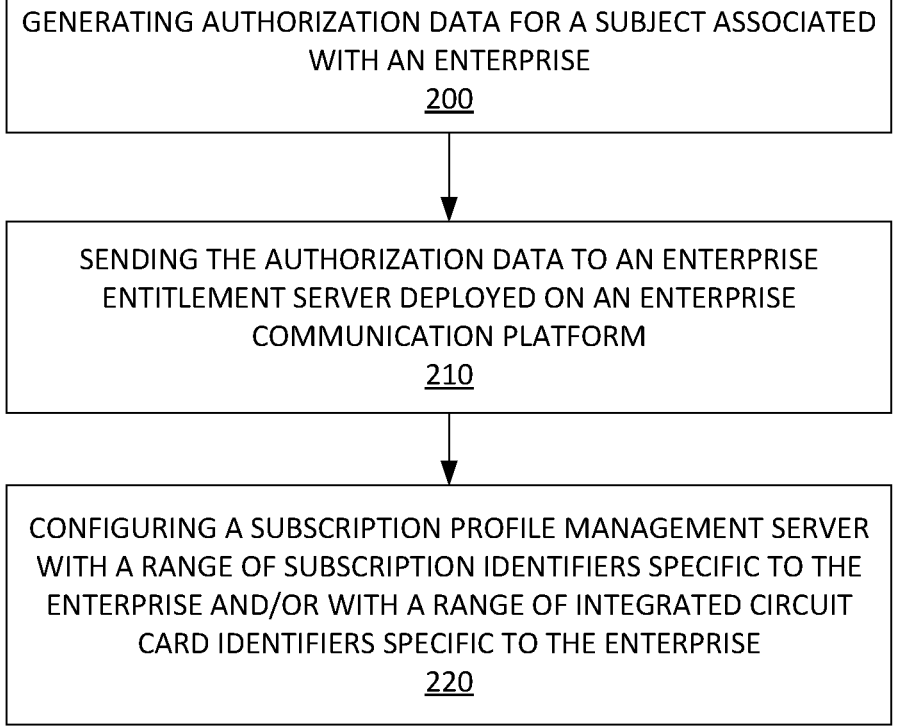

GENERATING AUTHORIZATION DATA FOR A SUBJECT ASSOCIATED
WITH AN ENTERPRISE
200

SENDING THE AUTHORIZATION DATA TO AN ENTERPRISE
ENTITLEMENT SERVER DEPLOYED ON AN ENTERPRISE
COMMUNICATION PLATFORM
210

CONFIGURING A SUBSCRIPTION PROFILE MANAGEMENT SERVER
WITH A RANGE OF SUBSCRIPTION IDENTIFIERS SPECIFIC TO THE
ENTERPRISE AND/OR WITH A RANGE OF INTEGRATED CIRCUIT
CARD IDENTIFIERS SPECIFIC TO THE ENTERPRISE
220

*FIGURE 6*

ENTERPRISE SUBSCRIPTION MANAGEMENT

TECHNICAL FIELD

The present application relates generally to subscription management, and relates more particularly to subscription management for an enterprise.

BACKGROUND

An enterprise needs to control and define network services and subscriber identity module (SIM) profiles for a group of subscriptions within the enterprise domain. Traditionally, an enterprise orders a set of physical SIM cards from a network service provider, e.g., a mobile network operator. Any enterprise services are linked to those SIM cards beforehand from the network service provider. All pre-ordered SIM cards will be produced with one profile valid for all employees of the enterprise. The SIM cards are then distributed to employees. Such a manual process poses complexity for enterprises especially when an enterprise changes communication service providers (CSPs). Indeed, the enterprise often must have a specific department to keep track of employees, their service consumption, failure and disturbance aspects, support, and other criteria. This manual process also makes it difficult for the enterprise to update policy or other subscription changes during life cycle operation, since it may be significantly difficult to update the physical SIM cards after delivery from the network service provider. Besides, the card management is performed manually resulting in a costly and time-consuming logistic process.

An embedded subscriber identity module (eSIM) is embedded directly into a device and enables remote SIM provisioning of the device. eSIM is designed to provide remote SIM profiles and subscription management for individual consumers. With the introduction of eSIM, the logistics and delivery time can be improved. But although eSIM represents an improvement over traditional SIM, eSIM still can result in costly logistics, bad user experience, and inconsistency regarding enterprise subscription management. As an example, some employees may need a subscription limited to an enterprise boundary, others could be assigned a subscription valid within all company buildings or subsidiaries, while still others could be assigned an open subscription with global roaming ability.

This need for enterprise roaming capabilities complicates subscription management, especially when the enterprise provides services via its own private service network but uses a third party's access network (e.g., a mobile network operator network) to provide roaming access to the service network. In this case, a mobile network operator mainly acts as a connectivity provider while the enterprise controls the service aspect. Furthermore, the enterprise controls the connectivity policy, e.g., who is allowed to receive the connectivity service. Thus, there is a need for the enterprise to manage its subscriptions and credentials required to access the service.

SUMMARY

It would be advantageous to achieve method(s), apparatus(es) and system(s) overcoming, or at least alleviating, the above-mentioned drawback(s). In particular, it would be desirable enable an enterprise to manage subscriptions related to that enterprise. To address one or more of these concerns, a methods and apparatuses as defined in the independent claims are provided. Preferable embodiments are defined in the independent claims.

According to some embodiments herein, an enterprise hosts or otherwise controls an enterprise authorization server. The enterprise authorization server coordinates and/or cooperates with an enterprise entitlement server for subscription management, e.g., in such a way that equips the enterprise with increased autonomy over the management of its subscriptions, even when the resources to which the subscriptions entitle subjects are provided by a third party. In these and other cases, some embodiments advantageously enable an enterprise itself to dynamically assign to which resource(s) a subscription entitles a subject, e.g., no matter whether the resource(s) are controlled by the enterprise or a third party such as a mobile network operator. Indeed, in some embodiments, the enterprise may dynamically maintain and update authorization data as needed, e.g., to manage subscriptions of subjects in real-time. Alternatively or additionally, some embodiments advantageously enable the enterprise itself to control lifecycle events for a subscription, e.g., attributable to subscription management actions.

More particularly, some embodiments herein include a method performed by an enterprise entitlement server deployed on an enterprise communication platform. The method comprises retrieving, from an authorization server controlled by an enterprise, authorization data that indicates to which one or more resources a subject of the enterprise is entitled to subscribe and/or that indicates which one or more types of subscription management actions the subject is authorized to perform. The method further comprises controlling management of a subscription for the subject in accordance with the authorization data.

In some embodiments, the method further comprises controlling provisioning of the one or more resources to which the subject is entitled.

Embodiments herein also include a method performed by an enterprise authorization server. The method comprises generating authorization data for a subject associated with an enterprise, wherein the authorization data indicates to which one or more resources the subject is entitled to subscribe and/or indicates which one or more types of subscription management actions the subject is authorized to perform. The method further comprises sending the authorization data to an enterprise entitlement server deployed on an enterprise communication platform. In some embodiments, the method alternatively or additionally comprises configuring a subscription profile management server with a range of subscription identifiers specific to the enterprise and/or with a range of integrated circuit card identifiers specific to the enterprise.

Embodiments herein also include corresponding apparatus, computer programs, and carriers of those computer programs.

Some embodiments in particular include an end-to-end sequence flow addressing the authentication of an employee, the enterprise allocation of subscription profile per individual or device, and/or differentiated policy setting depending on whether the device is supplied by enterprise or owned by the user (i.e. bring Your Own Device). Some embodiments alternatively or additionally exploit an architecture enabling the isolation of communication service per enterprise and a set of ordering routines to distinguish an enterprise from public users when requesting the generation of a new SIM profile. In these and other ways, some embodiments provide seamless and efficient eSIM subscription management serving the enterprise domain.

In one or more embodiments, for example, an enterprise directly controls subscription management events for its subscriptions (e.g., employee or devices it owns). By this, an enterprise can also define who or which device can receive what enterprise services and credentials to access those service. Additionally or alternatively, an enterprise can control subscription lifecycle events for enterprise managed subscriptions.

In some embodiments, an enterprise employee will benefit from an easy, seamless, and instant onboarding of his or her enterprise subscription at start-up, as well as at change of device or CSP subscription. Alternatively or additionally, an enterprise can advantageously flexibly manage network access subscriptions for its employees and devices for which the access service is provided by a third party e.g., mobile network operator (MNO). In some embodiments, for example, an enterprise can dynamically assign services, either controlled by the enterprise or by the MNO, for each subscription. Additionally, an enterprise in some embodiments can control lifecycle events for a subscription.

BRIEF DESCRIPTION OF THE DRAWINGS

The accompanying drawings, which are included to provide a further understanding of the disclosure, illustrate non-limiting embodiments of inventive concepts. In the drawings:

FIG. 6 is a logic flow diagram of a method performed by an enterprise authorization server according to some embodiments.

All the figures are schematic and generally only show parts which are necessary in order to elucidate the embodiments, wherein other parts may be omitted.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 1:
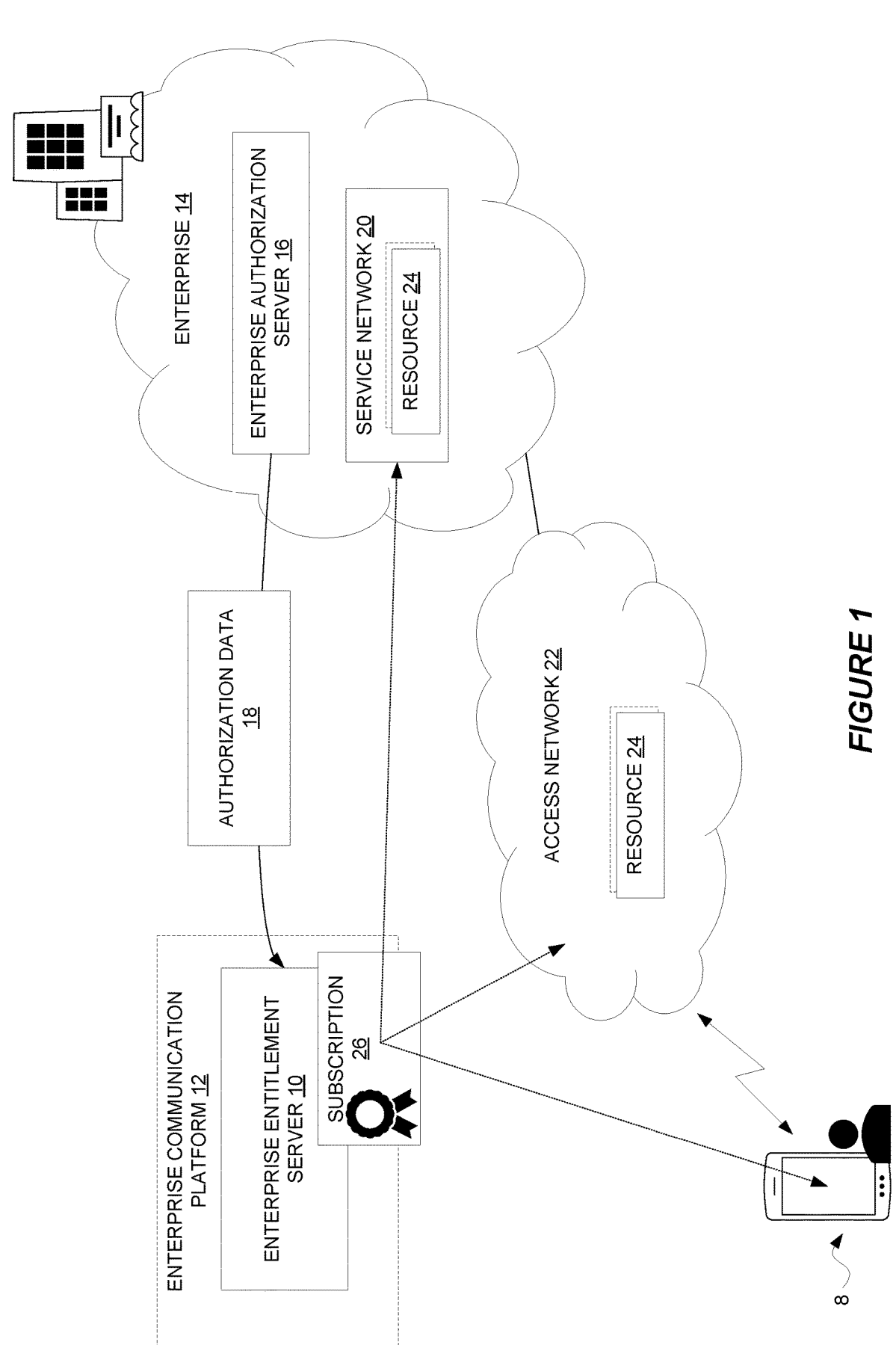
FIG. 1 is a block diagram of an enterprise entitlement server and an enterprise authorization server according to some embodiments.

According to FIG. 1, an enterprise 14 has devices, users, or other so-called subjects that use resources 24. The resources 24 may for example include resources of a service network 20 and/or resources of an access network 22. In some embodiments as shown, the service network 20 is provided by and/or controlled by the enterprise 14, e.g., as a private network. Alternatively or additionally, the access network 22 may be provided by and/or controlled by a third party, such as a mobile network operator with which the enterprise 14 has a business agreement, e.g., so that the enterprise 14 can offer the services of the service network 20 outside of the service network's boundary as devices move around. The resources 24 in any event may include resources for providing data services, IP-Multimedia Subsystem (IMS) voice services, call recording services, spoof caller detection services, or the like. In order to use a particular resource, any given subject must have a subscription that entitles the subject to that particular resource, e.g., even with regard to resources of an access network 22 that is controlled by a third party.

FIG. 1 shows enterprise subscription management according to some embodiments that equip the enterprise 14 itself with increased autonomy over the management of its subscriptions. As shown, an enterprise entitlement server 10 is deployed on an enterprise communication platform 12, e.g., in a mobile network that provides the access network 22 for the enterprise 14. In some embodiments, the enterprise entitlement server 10 is configured to provide enterprise-specific entitlement services for one or more enterprises, including enterprise 14 shown in FIG. 1. In one such embodiment, the enterprise entitlement server 10 and/or the enterprise communication platform 12 is dedicated to enterprise 14, whereas in another embodiment the enterprise entitlement server 10 and/or the enterprise communication platform 12 is common to multiple enterprises.

Regardless, FIG. 1 shows that enterprise 14 hosts or otherwise controls an enterprise authorization server 16. The enterprise authorization server 16 coordinates and/or cooperates with the enterprise entitlement server 10 for subscription management, e.g., in such a way that equips enterprise 14 with increased autonomy over the management of its subscriptions, even when the resources 24 to which the subscriptions entitle subjects are provided by a third party.

In this regard, FIG. 1 shows that the enterprise authorization server 16 transmits authorization data 18 to the enterprise entitlement server 10, e.g., on a dynamic basis over a communication interface established between the servers 10, 16. The authorization data 18 indicates to which one or more resources 24 a subject 8 of the enterprise 14 is entitled to subscribe and/or indicates which one or more types of subscription management actions the subject 8 is authorized to perform. The enterprise entitlement server 10 controls management of a subscription 26 for the subject 8 in accordance with this authorization data 18. This may entail, for instance, provisioning a subscription 26 for the subject 8 that entitles the subject 8 to the one or more resources 24 indicated by the authorization data 18. Alternatively or additionally, this may entail controlling which one or more types of subscription management actions are performed for managing a subscription 26 for the subject 8, e.g., where such actions may include subscription provisioning, modification, and/or deletion. Alternatively or additionally, this may entail controlling provisioning of the one or more resources 24 (e.g., in the service network and/or the access network 22) to which the subject 8 is entitled.

By way of the authorization data 18, then, some embodiments advantageously enable the enterprise 14 itself to control management of the subscription 26 for the subject 8, at least to some extent. Some embodiments enable this even when at least some of the resource(s) 24 to which the subscription 26 entitles the subject 8 are resources of an access network 22 and/or are provided by a third party such as a mobile network operator. Alternatively or additionally, some embodiments advantageously enable the enterprise 14 itself to dynamically assign to which resource(s) 24 a subscription 26 entitles a subject, e.g., no matter whether the resource(s) 24 are controlled by the enterprise 14 or a third party such as a mobile network operator. Indeed, in some embodiments, the enterprise 14 may dynamically maintain and update the authorization data 18 as needed, e.g., to manage subscriptions of subjects in real-time. Alternatively or additionally, some embodiments advantageously enable the enterprise 14 itself to control lifecycle events for a subscription, e.g., attributable to subscription management actions.

Figure 2A:
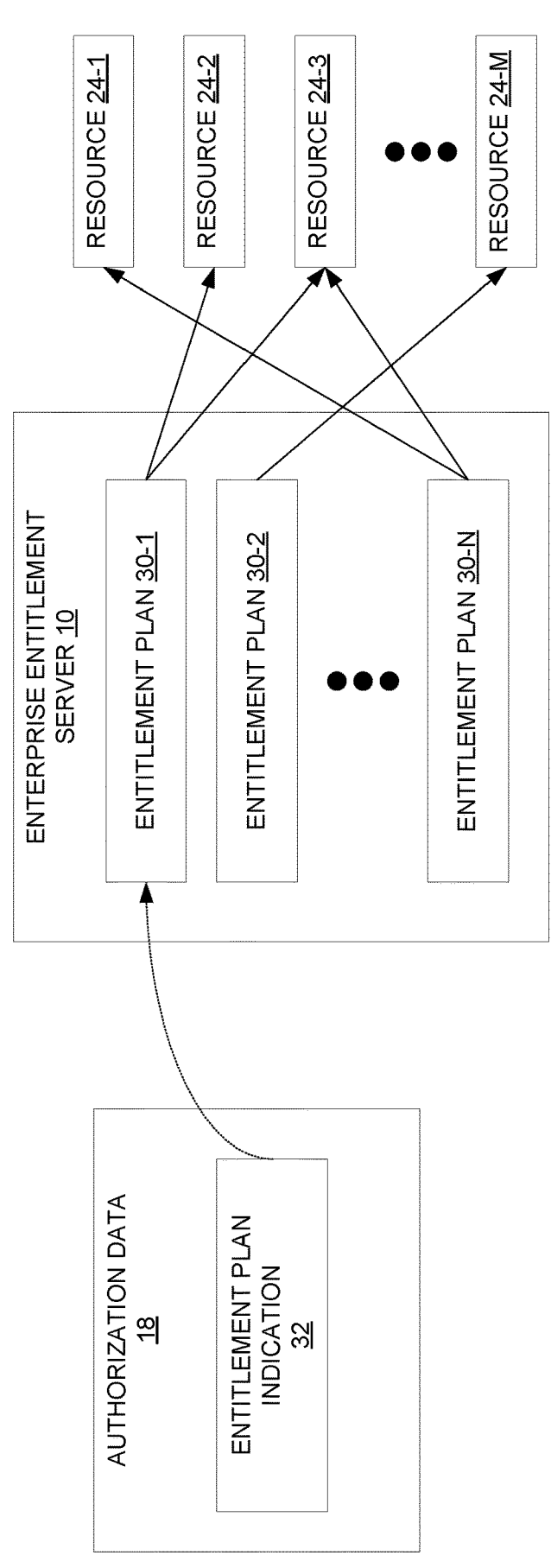
FIG. 2A is a block diagram of an enterprise entitlement server with entitlement plans according to some embodiments.

In any event, note that the authorization data 18 may indicate to which one or more resources 24 a subject 8 of the enterprise 14 is entitled to subscribe, and/or indicate which one or more types of subscription management actions the subject 8 is authorized to perform, in any number of ways, e.g., directly or indirectly. In some embodiments, for example, the authorization data 18 indicates which one or more resources 24 a subject 8 of the enterprise 14 is entitled to subscribe with reference to an entitlement plan at the enterprise entitlement server 10. FIG. 2A illustrates one such example.

As shown in FIG. 2A, the enterprise entitlement server 10 obtains one or more entitlement plans 30-1, 30-2, . . . 30-N specific to the enterprise 8. The enterprise entitlement server 10 may for example obtain the entitlement plan(s) 30-1, 30-2, . . . 30-N from the enterprise 14 directly (e.g., as provisioned by the enterprise authorization server 16) or indirectly (e.g., via an operator of the access network 22). Regardless, each entitlement plan 30-1, 30-2, . . . 30-N is associated with one or more resources 24. As shown, for instance, entitlement plan 30-1 is associated with resources 24-2 and 24-3, entitlement plan 30-2 is associated with resource 24-M, and entitlement plan 30-N is associated with resources 24-1 and 24-3. In this case, then, the authorization data 18 indicates to which one or more resources 24 a subject 8 of the enterprise 14 is entitled to subscribe by indicating to which entitlement plan 30-1, 30-2, . . . 30-N the subject 8 is entitled. FIG. 2A for example shows that the authorization data 18 includes an entitlement plan indication 32, e.g., in the form of an index assigned to one of the entitlement plans 30-1, 30-2, . . . 30-N. The authorization data 18 in the example of FIG. 2A thereby explicitly indicates to which entitlement plan 30-1, 30-2, . . . 30-N the subject 8 is entitled, e.g., using a field or other indication dedicated to indicating an entitlement plan.

Figure 2B:
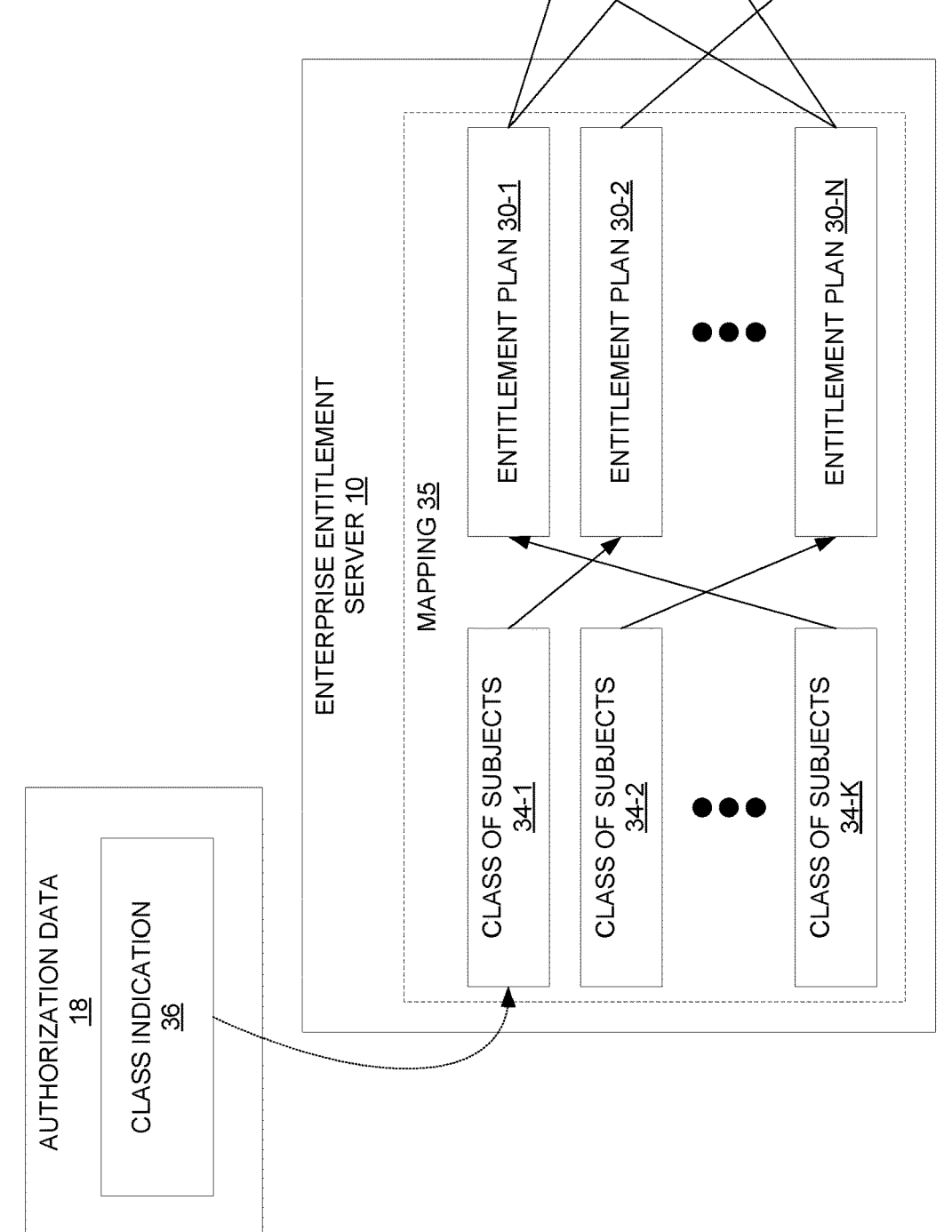
FIG. 2B is a block diagram of an enterprise entitlement server with entitlement plans according to some embodiments.

FIG. 2B by contrast shows another example whereby the authorization data 18 indirectly or implicitly indicates to which entitlement plan 30-1, 30-2, . . . 30-N the subject 8 is entitled. As shown in FIG. 2B, the enterprise entitlement server 10 obtains a mapping 35 of which classes 34-1, 34-2, . . . 34-K of subjects of the enterprise 14 are entitled to which one or more entitlement plans 30-1, 30-2, . . . 30-N.

Here, the classes 34-1, 34-2, . . . 34-K may classify subjects of the enterprise 14 on the basis of any characteristic(s) or attribute(s), such as to which respective departments of the enterprise 14 the subjects are associated. Regardless, the authorization data 18 in this case may indicate to which entitlement plan 30-1, 30-2, . . . 30-N the subject 8 is entitled by indicating to which one or more classes 34-1, 34-2, . . . 34-K the subject 8 belongs. FIG. 2B for example shows that the authorization data 18 includes a class indication 36, e.g., in the form of an index assigned to one of the classes 34-1, 34-2, . . . 34-K. The authorization data 18 in the example of FIG. 2B thereby implicitly or indirectly indicates to which entitlement plan 30-1, 30-2, . . . 30-N the subject 8 is entitled by way of the class indication 36.

Note, too, that the enterprise entitlement server 10 itself may alternatively or additionally enforce a requirement that a subject have one or more certain attributes in order for that subject to be entitled to an entitlement plan 30-1, 30-2, . . . 30-N. For example, the enterprise entitlement server 10 may obtain, for each entitlement plan 30-1, 30-2, . . . 30-N, one or more attributes required of any given subject in order for the given subject to be entitled to the entitlement plan 30-1, 30-2, . . . 30-N. Where a subject is a device, for instance, the required attribute(s) may be specified in terms of a type of the device. In this case, then, the enterprise entitlement server 10 enforces a requirement that a device must be of a certain type in order for that device to be entitled to an entitlement plan 30-1, 30-2, . . . 30-N.

Consider a simple example. In this example, the enterprise 14 provides enterprise communication services with the help of a 3GPP access network (mobile network). The enterprise 14 allows all employees of the enterprise 14 to use certain services e.g., printing service, when connected via the enterprise's own service network 20 (e.g., a private network). The enterprise 14 also selectively allows access network services e.g., International calling, 5G data services, 4G data services, IMS voice services, call forwarding, call recording, etc. selectively to its employees. The enterprise 14 has an agreement with a certain mobile network operator to provide these access network services.

In this example context, the enterprise authorization server 16 configures the enterprise entitlement server 10 with 4 entitlement plans. Plan A entitles members of the plan to 4G data service and IMS voice services. Plan B entitles members of the plan to 5G data service and IMS voice services. Plan C entitles members of the plan to IMS voice services. And Plan D entitles members of the plan to IMS voice services, call recording, call forwarding, and Spoof caller detection. The enterprise authorization server 16 also configures the enterprise entitlement server 10 with the following mapping.

[Plan A]=Plan A
[Plan B|customer care], [device_5G && device from Vendor X]=Plan B
[Plan C|customer care && No voice], [device_4G && device from Vendor Y]=Plan C
[Plan D|sales], [device_5G && device from vendor X or Y]=Plan D According to this mapping, the enterprise entitlement server 10 maps a subject to Plan A if the authorization data 18 received for that subject indicates that the subject is entitled to Plan A. The enterprise entitlement server 10 maps a subject to Plan B if the authorization data 18 received for that subject indicates either that the subject is entitled to Plan B or that the subject belongs to a "customer care" class of subjects, provided that the subject has a device capable of 5G data services and from Vendor X. The enterprise entitlement server 10 maps a subject to Plan C if the authorization data 18 received for that subject indicates either that the subject is entitled to Plan C or that the subject belongs to both a "customer care" class of subjects and a "no voice" class of subjects, provided that the subject has a device capable of 4G data services and from Vendor Y. And the enterprise entitlement server 10 maps a subject to Plan D if the authorization data 18 received for that subject indicates either that the subject is entitled to Plan D or that the subject belongs to a "sales" class of subjects, provided that the subject has a device capable of 5G data services and from either Vendor X or Vendor Y.

Consider now what happens when the enterprise 14 onboards a new employee "Bob" with the following authorization data:

> Bob—Entitlement data: sales; SIM profile policy: no delete of SIM profile, no redownload of same; geolocation policy: data service allowed in office premise; service credentials: Printer password Bob has a 5G phone from vendor Y. Bob requests the enterprise entitlement server 10 for a SIM profile. The enterprise authorization server 16 authenticates Bob and sends Bob's authorization data to the enterprise entitlement server 10. In this example the authorization data may, for example, be single sign-on authorization data, based on user email or username and single sign-on password. Upon receiving the authorization data for Bob and the data from the request (5G device from vendor Y), the enterprise entitlement server 10 determines that Bob is entitled to Plan D. The enterprise entitlement server 10 therefore controls provisioning of a subscription for Bob (e.g., by provisioning a SIM profile for Bob) that entitles Bob to IMS voice services, call recording, call forwarding, and Spoof caller detection.

Later, the enterprise entitlement server 10 receives a request from Bob to delete his SIM profile. However, the enterprise entitlement server 10 rejects this request on the basis that Bob's authorization data 18 indicates that subscription deletion is not a subscription management action that Bob is authorized to perform.

Figure 3:
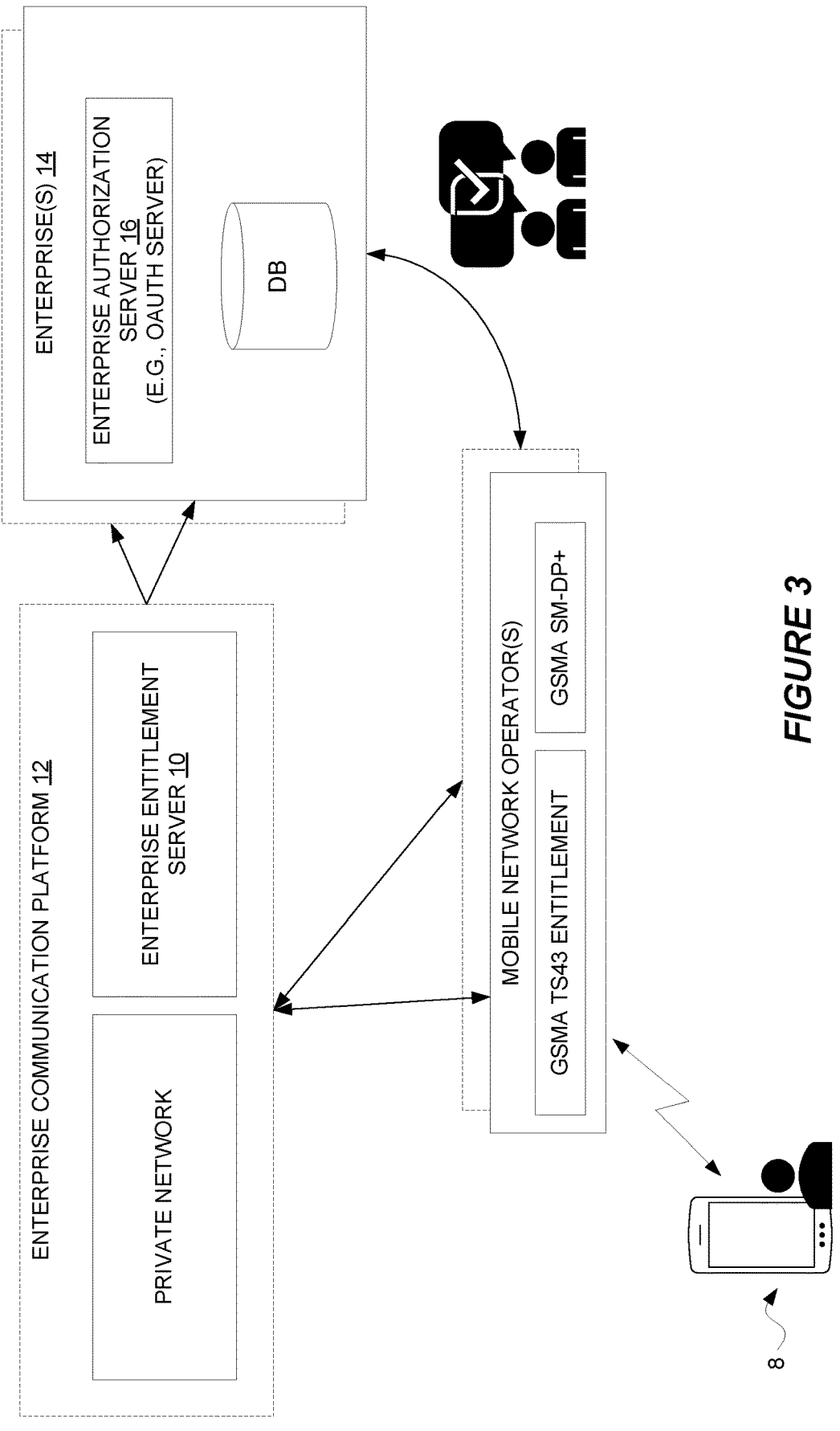
FIG. 3 is a block diagram of an enterprise communication platform according to some embodiments.

Consider now an architectural overview as an additional example of some embodiments herein. As shown in FIG. 3 at a high level, some embodiments use an enterprise communication platform 12 consisting of at least the enterprise entitlement server 10 that manages the authentication and authorization of devices using the enterprise database (DB) and enterprise authorizations server 16 (e.g., in the form of an Oauth server). Based on successful authorization of employee or device entity subject for onboarding, the enterprise communication platform 12 utilizes the service provider (e.g., mobile network operator) for assigning mobile identity and service profile data.

The profile assigned to the device contains enterprise policy setting as specified by the business agreement between the enterprise 14 and mobile network operator (MNO). The policy rules applied depends on whether the device is owned by the enterprise or by the end-user in case the concept of bring your own device applies (i.e. subscription supporting BYOD). In some embodiments, it is assumed that the device is supporting eSIM where multiple profiles can be downloaded, e.g., private subscription, business subscription, other subscription.

The business agreement may specify a specific set of information to control the subscription scope, identities to handle, billing information, roaming facility, internet access or other criteria. As an example, the agreement may specify a specific IMSI series for the enterprise to use, specific MSISDN series, and/or charging information leading to billing the enterprise rather than end-user for assigned business subscription. The information may also identify the mobility aspects of a subscription where some end-users are permitted to use the service within the enterprise premises within one country or in all subsidiaries of a company across the globe. Or the end-user is allowed to breakout (i.e., allowed roaming in public domain). As a concrete example, an enterprise can set a geo-location policy that when a device is within the enterprise physical boundary, it can only connect to the enterprise private network. For this, the SIM profile delivered by the enterprise 14 can include enterprise location data which are consumed before allowing access to the enterprise network over the access network (e.g., a 3GPP network).

In some embodiments, the enterprise 14 offers network services for its employees and devices such as laptop and mobile smartphones. Enterprise policy rules may indicate whether employees can bring their own devices eligible for a business subscription service, such as note books or watches, etc. In some embodiments, the enterprise 14 has one or more private communication networks within which it operates multiple services e.g., SIP calling, toll free number, and universal number for employees or their devices. Only authorized devices can access the private network and the services it provides. In some embodiments, one or more of these services are accessed over a 3GPP network provided by an MNO which acts as a connectivity provider. Due to that, the MNO may control the credentials required for connectivity.

In any event, the service subscription in some embodiments may be managed within a private network facility operated within the enterprise communication platform 12 or by the MNO facilities and core system, e.g., through a specific slice dedicated for enterprise communication service offerings. In this case, the slice could be applied to assure that communication is managed based on higher security and encrypted content, improved bandwidth and/or calls/session priority against other public users sharing the same core network utilities.

When using a private network, all communication may be are terminated in the enterprise communication platform 12. For example, the end-users may call their working colleagues using short dialing number. As another example, end-users may utilize group numbers and hunting group to reach service assistance for help. When users are allowed to breakout, the originating session is processed by the enterprise communication platform 12 that performs the breakout to the public network to reach external B-parties.

In some embodiments, the enterprise entitlement server 12 enables seamless authentication of users and devices through the enterprise human resources (HR) database (DB) facility, avoiding manual process handling for new or terminated employment or if a user changes his or her business subscription service, e.g. opening breakout facility. Users will benefit from a seamless onboarding for their devices utilizing e.g. QR code or enterprise web portal facility. In some embodiments, the MNO specifies the service to assign for different sets of device brands or models. The enterprise entitlement server 12 in some embodiments can detect the device type and select the service authorized by the previously signed business agreement. The enterprise entitlement server 12 in some embodiments requests from the CSP/MNO the preparation of a business profile containing information using an API or GSMA defined ES2+ interface to convey the enterprise name or ID, the user identity to allocate (if applicable), service data to prepare for the resulting SIM profile, and/or the policy rules to set for the device and network subscription and the charging information to use.

Generally, then, the approach in some embodiments is to provide a list of employees with associated devices that can be onboarded and service, roaming facilities to assign. Such data can be submitted to an enterprise-specific entitlement server 12 or retrieved from the enterprise DB storage media during the eligibility check procedure. The Enterprise 14 can maintain and update the list for new employees or removal of subscribers or modifying the authority of a subscriber in real time.

In some embodiments, the CSP will provide support for communication and subscription rules, to be applied in closed user groups and billed according to bilateral agreement signed per enterprise. The enterprise communication platform 12 in some embodiments may be owned by CSP and/or be offered as a service operated in a public cloud on behalf of the CSP serving multiple enterprises, fully isolated from security and privacy perspective.

Figure 4:
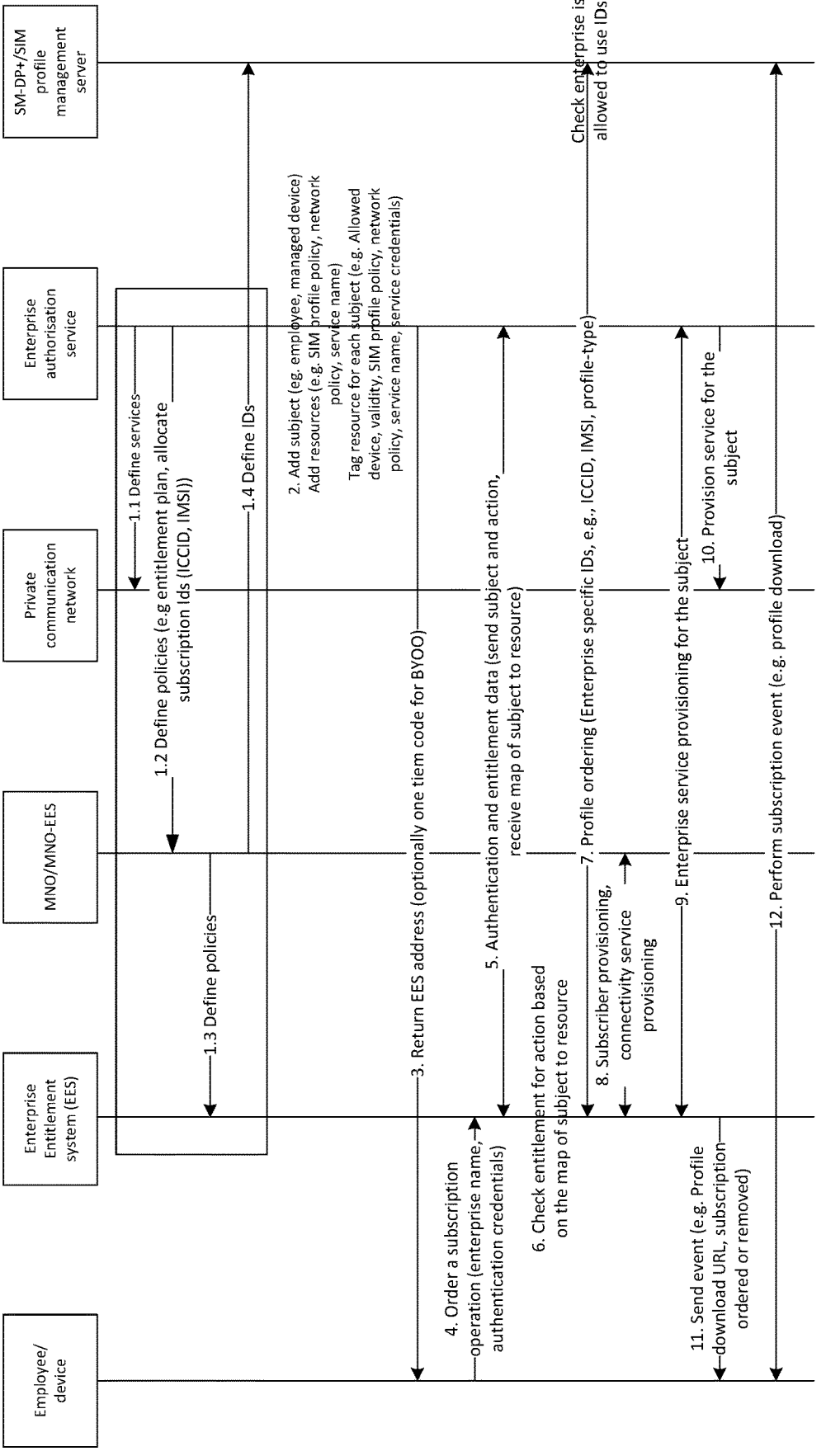
FIG. 4 is a call flow diagram for enterprise subscription management according to some embodiments.

FIG. 4 shows the enterprise subscription management process flow according to some embodiments. The enterprise entitlement server (EES) 10 performs entitlement check for each new subscription event for an enterprise 14 based on the authorization data 18 it receives from the enterprise authorization server 16, orders credentials for the device to access the service (either connectivity or service), and triggers provisioning of the enterprise network for the new subscription.

A SIM (or eSIM) profile management server manages SIM profile setting and its life cycle, i.e., creation, modification, deletion operation for a 3GPP SIM profile. A SIM profile is owned by an MNO (access network provider). A device authenticates itself towards the MNO using a specific authentication and its credentials within the SIM profile. The SIM profile may embed a 3GPP specified authentication algorithm using standard or other type of credentials mandated by the enterprise. A device may use the non-3GPP credentials to authenticate to the enterprise service, if required.

An employee obtains an instruction with QR code or downloads an enterprise onboarding app to the device enabling the onboarding of any device eligible for a business subscription profile. By scanning the QR code or activating the enterprise onboarding app, the device connects to the enterprise entitlement server 10 over a secure connectivity channel, which initiates the device onboarding process.

More specifically, on a step by step basis with reference to FIG. 4:

1. An enterprise defines services in its private network (Message 1.1). This could be SIP calling, call baring, toll free number, specific billing service, etc.

The enterprise also defines connectivity (access network) provider policies (Message 1.2). It can also define policies for how and when the connectivity service provider (MNOs) forwards traffic to the enterprise private network. For example, an enterprise can allocate a specific ICCID and an IMSI range from the connectivity service provider and define traffic forwarding rules for those specific IMSIs. Part of the same information is also populated to the SIM profile management server, e.g., SM-DP+ (Message 1.4). For example, MNO can define the enterprise defined ICCID and IMSI range against an enterprise ID in the SM-DP+ sever. Similarly, specific profile content e.g., FQDN of the enterprise server can be embedded for this enterprise id in the SM-DP+ server.

The enterprise or via the MNO configures the enterprise entitlement server, EES, with entitlement plans (Message 1.3). A plan includes a set of resources and policies. When assigned to a subscription, it means the subscription can use those resources based on the defined policies. For example, enterprise can define for an entitlement "plan A", all smartphone subscriptions should get IMS service from the MNO and international call baring. All laptops should get packet data with unlimited data plan.

2. The enterprise authorization service onboards a new subject e.g., employee or a device. As part of the subject onboarding, the enterprise allocates resources for each subject. This could be allowed services provided by the network to the subject, credentials policy to access the service (e.g., profile policy), and a hint for the MNO to select the proper connectivity service (e.g., Plan A).

3. The enterprise can, optionally, inform the subject to trigger a subscription management activity. For example, the enterprise can send an email to the employee or provide an onboarding instruction document to start preparation of an embedded business profile from an enterprise specific endpoint (URL of the EES). The enterprise may provide a one-time code or utilize single sign on (SSO) capability to authenticate the employee to the EES. Alternatively, an enterprise service using an onboarding web portal can trigger the enterprise entitlement server to perform a subscription event for the new subject. The enterprise may deliver the subject ID in this message (not shown). The subject ID can be a pre-defined enterprise ID.

4. The subject can, optionally, request the EES to perform a subscription management action. This action can be e.g., business specific SIM profile ordering to access connectivity service, credentials to access the enterprise service. This step is not required if an enterprise directly triggers the EES to perform a subscription event.

5. The subject, optionally, authenticates to the enterprise authorization server and requests release of authorization data to the EES. For authentication, the subject may use a pre-existing enterprise trust setup (e.g., it can be set up using the enterprise username/password, one time code supplied, or based on single sign on information). In any case, for each subject, and the action the subject wants to perform, the EES obtains authorization data for the subject from the enterprise authorization service. In this process, the enterprise also provides subject-specific enterprise service credentials to the EES or request the EES to generate the credentials for the subject. In some embodiments, the authorization data may include one or more of: subject name (e.g., employee, device name), resources (e.g., policies, service name, network policies), and subject to resources association. The enterprise can expose the authorization data through an interface to other entities.

6. The EES performs entitlement check based on earlier defined policies in step 1 and the received authorization data in step 5.

7. The EES requests the GSMA SM-DP+ profile management server to perform a subscription activity, using an enterprise specific profile ordering API. The request includes Enterprise ID, and optionally enterprise specific ID information. In case where the enterprise has signed multiple business agreements with multiple CSP/MNOs, the enterprise id and the requesting MNO may facilitate the selection of the proper profile from the SM-DP+ server. This results in generation of a new IMSI with appropriate credentials, e.g., 3GPP access credentials for a subscriber and associated service profile data for business subscription. The GSMA SM-DP+ profile management server may check the eligibility of the enterprise to use specific IDs and services based on earlier provisioned information at step 1. For example, it may check if the enterprise is authorized to perform an action on an ICCID.

8. The EES triggers provisioning of services in the connectivity provider. This can be access credentials and services to access the enterprise private network in the MNO side.

9. The EES triggers the enterprise to provision subject-specific service provisioning in their private network. It may also deliver service-specific credentials generated by the SIM profile management server to the enterprise. Enterprises can provision the network with these credentials, so the subject can access the enterprise network using those credentials.

10. The enterprise provisions network services for a specific subject.

11. EES informs the subject to perform a subscription management activity. The way EES informs the subject may vary from case to case. This could be an event sent to the specific device or the device can query a specific server for an event. For example, SM-DP+ provider can send an event to the SM-DS (discovery service) and the device can pull events targeted for the subject from the event repository. Another approach could be, the EES use device vendor specific push message to inform the subject about an event.

12. The subject performs a subscription action defined in the event. For example, the subject can download a profile from a specific MNO's SM-DP+ server. Or the subject can delete a profile based on the event and let the SM-DP+ server know about it.

Figure 5:
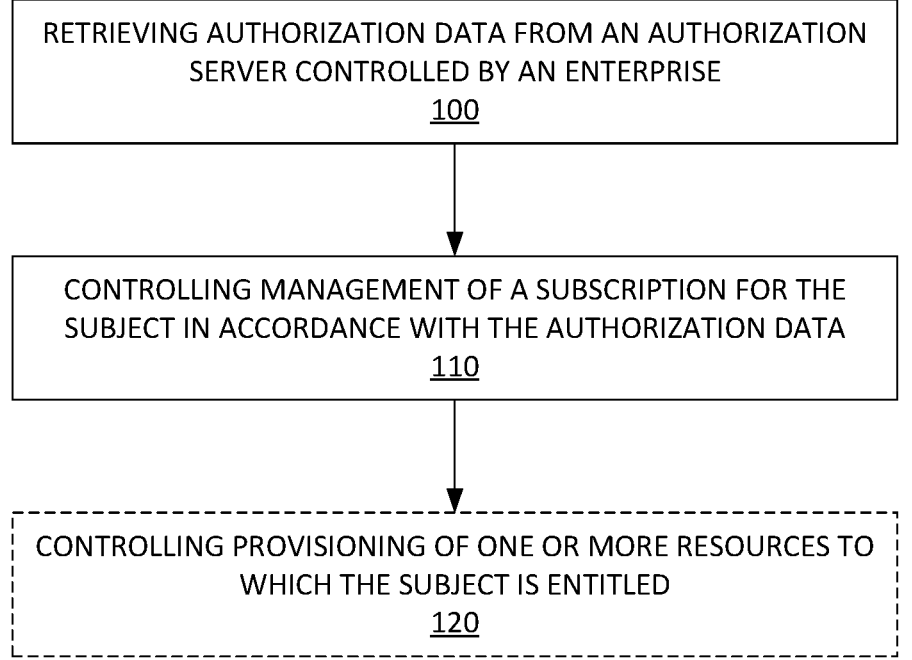
FIG. 5 is a logic flow diagram of a method performed by an enterprise entitlement server according to some embodiments.

In view of the above modifications and variations, FIG. 5 depicts a method performed by an enterprise entitlement server 10 deployed on an enterprise communication platform 12 in accordance with particular embodiments. The method includes retrieving authorization data 18 from an authorization server 16 controlled by an enterprise 14 (Block 100). The authorization data 18 indicates to which one or more resources 24 a subject 8 of the enterprise 14 is entitled to subscribe and/or indicates which one or more types of subscription management actions the subject 8 is authorized to perform. The method further comprises controlling management of a subscription 26 for the subject 8 in accordance with the authorization data 18 (Block 110).

In some embodiments, the method further comprises obtaining one or more entitlement plans 30-1, 30-2, . . . 30-N specific to the enterprise. Each entitlement plan 30-1, 30-2, . . . 30-N is associated with one or more resources 24. The authorization data 18 indicates to which one or more resources 24 a subject 8 of the enterprise 14 is entitled to subscribe by indicating to which entitlement plan 30-1, 30-2, . . . 30-N the subject 8 is entitled. In one embodiment, for example, the authorization data 18 explicitly indicates to which entitlement plan 30-1, 30-2, . . . 30-N the subject 8 is entitled. In another embodiment, by contrast, the method further comprises obtaining a mapping 35 of which classes 34-1, 34-2, . . . 34-K of subjects 8 of the enterprise 14 are entitled to which one or more entitlement plans 30-1, 30-2, . . . 30-N, and the authorization data 18 indicates to which entitlement plan 30-1, 30-2, . . . 30-N the subject 8 is entitled by indicating to which one or more classes 34-1, 34-2, . . . 34-K the subject 8 belongs.

Alternatively or additionally, the method in some embodiments further comprises obtaining, for each entitlement plan 30-1, 30-2, . . . 30-N, one or more attributes required of any given subject in order for the given subject to be entitled to the entitlement plan 30-1, 30-2, . . . 30-N. In this case, the method may also comprise determining an entitlement plan 30-1, 30-2, . . . 30-N to which the subject 8 is entitled according to the authorization data 18, and enforcing a requirement that the subject 8 have the one or more attributes obtained for the determined entitlement plan 30-1, 30-2, . . . 30-N.

Alternatively or additionally, controlling management of a subscription 26 for the subject 8 in some embodiments comprises controlling provisioning of a subscription 26 for the subject 8 that entitles the subject 8 to the one or more resources 24 indicated by the authorization data 18. In one embodiment, for example, controlling provisioning of a subscription 26 for the subject 8 comprises: requesting a profile management server to generate a profile of a subscription 26 that entitles the subject 8 to the one or more resources 24 indicated by the authorization data 18; and triggering the subject 8 to obtain subscription profile from the profile management server.

Alternatively or additionally, the method in some embodiments further comprises controlling provisioning of the one or more resources 24 to which the subject 8 is entitled (Block 120).

In some embodiments, controlling management of a subscription 26 for the subject 8 comprises controlling, in accordance with the authorization data 18, which type of subscription management action is performed for managing a subscription 26 for the subject 8.

In some embodiments, the one or more types of subscription management actions include one or more of: provisioning of a subscription 26 for the subject 8; modifying a subscription 26 for the subject 8; and/or deleting a subscription 26 for the subject 8.

In some embodiments, the resources 24 include resources of an access network 22 that is provided by and/or controlled by a mobile network operator. Alternatively or additionally, in some embodiments, the resources 24 include resources of a service network 20 that is provided by and/or controlled by the enterprise 14.

In some embodiments, controlling management of a subscription 26 for the subject 8 in accordance with the authorization data 18 comprises controlling management of a Subscriber Identity Module, SIM, profile of the subscription 26 for the subject 8 in accordance with the authorization data 18.

In some embodiments, the enterprise communication platform 12 is deployed in a mobile network that provides an access network 22 for the enterprise 14. Alternatively or additionally, in some embodiments, the enterprise entitlement server 10 is configured to provide enterprise-specific entitlement services for one or more enterprises. Alternatively or additionally, in some embodiments, the enterprise entitlement server 10 is configured to provide entitlement services for entitlement to the resources of any of multiple mobile network operators.

In some embodiments, the subject 8 is a device or a user.

FIG. 6 depicts a method performed by an enterprise authorization server 16 in accordance with particular embodiments. The method includes generating authorization data 18 for a subject 8 associated with an enterprise 14 (Block 200). The authorization data 18 indicates to which one or more resources 24 the subject 8 is entitled to subscribe and/or indicates which one or more types of subscription management actions the subject 8 is authorized to perform. The method further comprises sending the authorization data 18 to an enterprise entitlement server 10 deployed on an enterprise communication platform 12 (Block 210).

In some embodiments where the authorization data 18 indicates to which one or more resources 24 the subject 8 is entitled to subscribe, the authorization data 18 indicates to which one or more resources 24 the subject 8 is entitled to subscribe by indicating to which entitlement plan 30-1, 30-2, . . . 30-N the subject 8 is entitled, where the entitlement plan 30-1, 30-2, . . . 30-N is associated with the one or more resources 24. In one embodiment, for example, the authorization data 18 explicitly indicates to which entitlement plan 30-1, 30-2, . . . 30-N the subject 8 is entitled. In another embodiment, the authorization data 18 indicates to which entitlement plan 30-1, 30-2, . . . 30-N the subject is entitled by indicating to which one or more classes 34-1, 34-2, . . . 34-K the subject 8 belongs, where different classes of subjects of the enterprise 14 are entitled to one or more respective entitlement plans 30-1, 30-2, . . . 30-N.

In some embodiments, the one or more types of subscription management actions include one or more of: provisioning of a subscription 26 for the subject 8; modifying a subscription 26 for the subject 8; and/or deleting a subscription 26 for the subject 8.

In some embodiments, the resources 24 include resources of an access network 22 that is provided by and/or controlled by a mobile network operator. Alternatively or additionally, in some embodiments, the resources 24 include resources of a service network 20 that is provided by and/or controlled by the enterprise 14.

In some embodiments, controlling management of a subscription 26 for the subject 8 in accordance with the authorization data 18 comprises controlling management of a Subscriber Identity Module, SIM, profile of the subscription 26 for the subject 8 in accordance with the authorization data 18.

In some embodiments, the enterprise communication platform 12 is deployed in a mobile network that provides an access network 22 for the enterprise 14. Alternatively or additionally, in some embodiments, the enterprise entitlement server 10 is configured to provide enterprise-specific entitlement services for one or more enterprises. Alternatively or additionally, in some embodiments, the enterprise entitlement server 10 is configured to provide entitlement services for entitlement to the resources of any of multiple mobile network operators.

In some embodiments, the subject 8 is a device or a user.

Alternatively or additionally, the method may comprise configuring a subscription profile management server with a range of subscription identifiers specific to the enterprise 14 and/or with a range of integrated circuit card identifiers specific to the enterprise 14 (Block 220).

Embodiments herein also include corresponding apparatuses. Embodiments herein for instance include an enterprise entitlement server 10 configured to perform any of the steps of any of the embodiments described above for the enterprise entitlement server 10.

Embodiments also include an enterprise entitlement server 10 comprising processing circuitry and power supply circuitry. The processing circuitry is configured to perform any of the steps of any of the embodiments described above for the enterprise entitlement server 10. The power supply circuitry is configured to supply power to the enterprise entitlement server 10.

Embodiments further include an enterprise entitlement server 10 comprising processing circuitry. The processing circuitry is configured to perform any of the steps of any of the embodiments described above for the enterprise entitlement server 10. In some embodiments, the enterprise entitlement server 10 further comprises communication circuitry.

Embodiments further include an enterprise entitlement server 10 comprising processing circuitry and memory. The memory contains instructions executable by the processing circuitry whereby the enterprise entitlement server 10 is configured to perform any of the steps of any of the embodiments described above for the enterprise entitlement server 10.

Embodiments herein also include an enterprise authorization server 16 configured to perform any of the steps of any of the embodiments described above for the enterprise authorization server 16.

Embodiments also include an enterprise authorization server 16 comprising processing circuitry and power supply circuitry. The processing circuitry is configured to perform any of the steps of any of the embodiments described above for the enterprise authorization server 16. The power supply circuitry is configured to supply power to the enterprise authorization server 16.

Embodiments further include an enterprise authorization server 16 comprising processing circuitry. The processing circuitry is configured to perform any of the steps of any of the embodiments described above for the enterprise authorization server 16. In some embodiments, the enterprise authorization server 16 further comprises communication circuitry.

Embodiments further include an enterprise authorization server 16 comprising processing circuitry and memory. The memory contains instructions executable by the processing circuitry whereby the enterprise authorization server 16 is configured to perform any of the steps of any of the embodiments described above for the enterprise authorization server 16.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
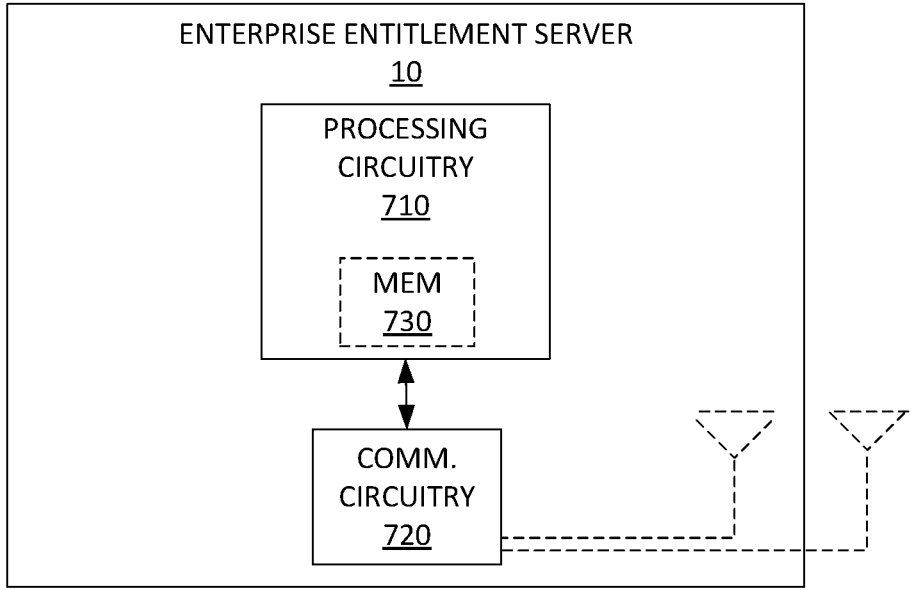
FIG. 7 is a block diagram of an enterprise entitlement server according to some embodiments.

FIG. 7 for example illustrates an enterprise entitlement server 10 as implemented in accordance with one or more embodiments. As shown, the enterprise entitlement server 10 includes processing circuitry 710 and communication circuitry 720. The communication circuitry 720 is configured to transmit and/or receive information to and/or from one or more other nodes, e.g., via any communication technology. The processing circuitry 710 is configured to perform processing described above, e.g., in FIG. 5, such as by executing instructions stored in memory 730. The processing circuitry 710 in this regard may implement certain functional means, units, or modules.

Figure 8:
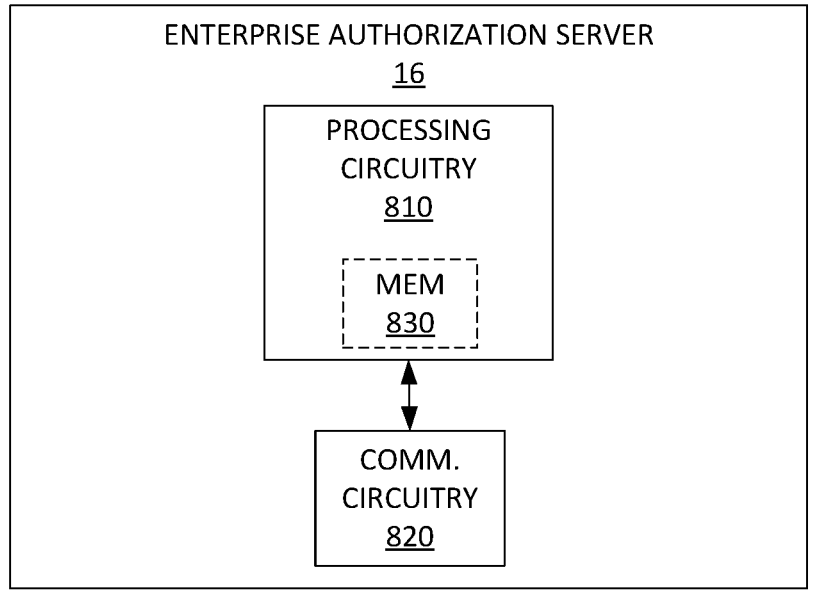
FIG. 8 is a block diagram of an enterprise authorization server according to some embodiments.

FIG. 8 illustrates an enterprise authorization server 16 as implemented in accordance with one or more embodiments. As shown, the enterprise authorization server 16 includes processing circuitry 810 and communication circuitry 820. The communication circuitry 820 is configured to transmit and/or receive information to and/or from one or more other nodes, e.g., via any communication technology. The processing circuitry 810 is configured to perform processing described above, e.g., in FIG. 6, such as by executing instructions stored in memory 830. The processing circuitry 810 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 9:
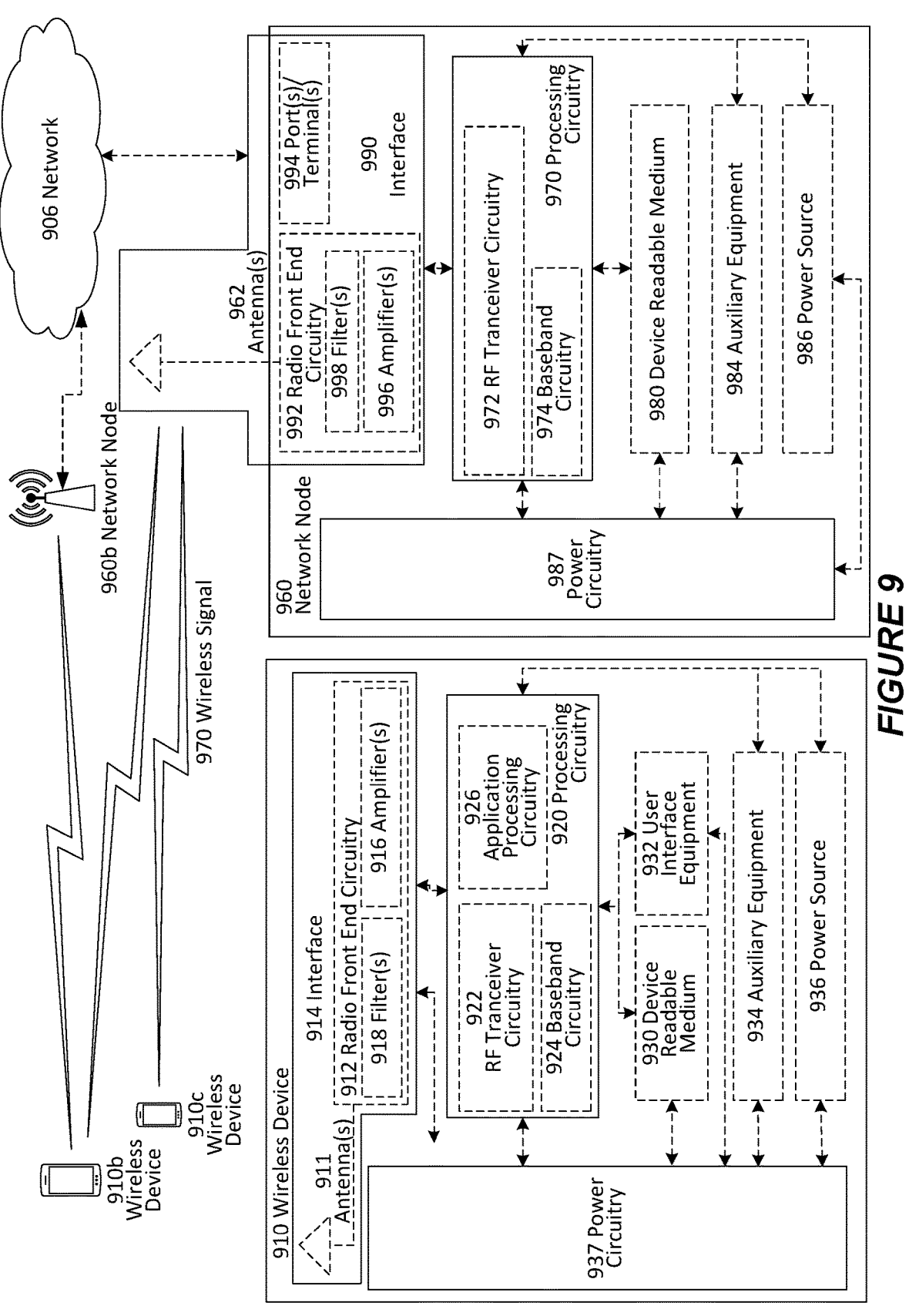
FIG. 9 is a block diagram of a wireless communication network according to some embodiments.

Although the subject matter described herein may be implemented in any appropriate type of system using any suitable components, some embodiments disclosed herein are described in relation to a wireless network, such as the example wireless network illustrated in FIG. 9. For simplicity, the wireless network of FIG. 9 only depicts network 906, network nodes 960 and 960*b*, and WDs 910, 910*b*, and 910*c*. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
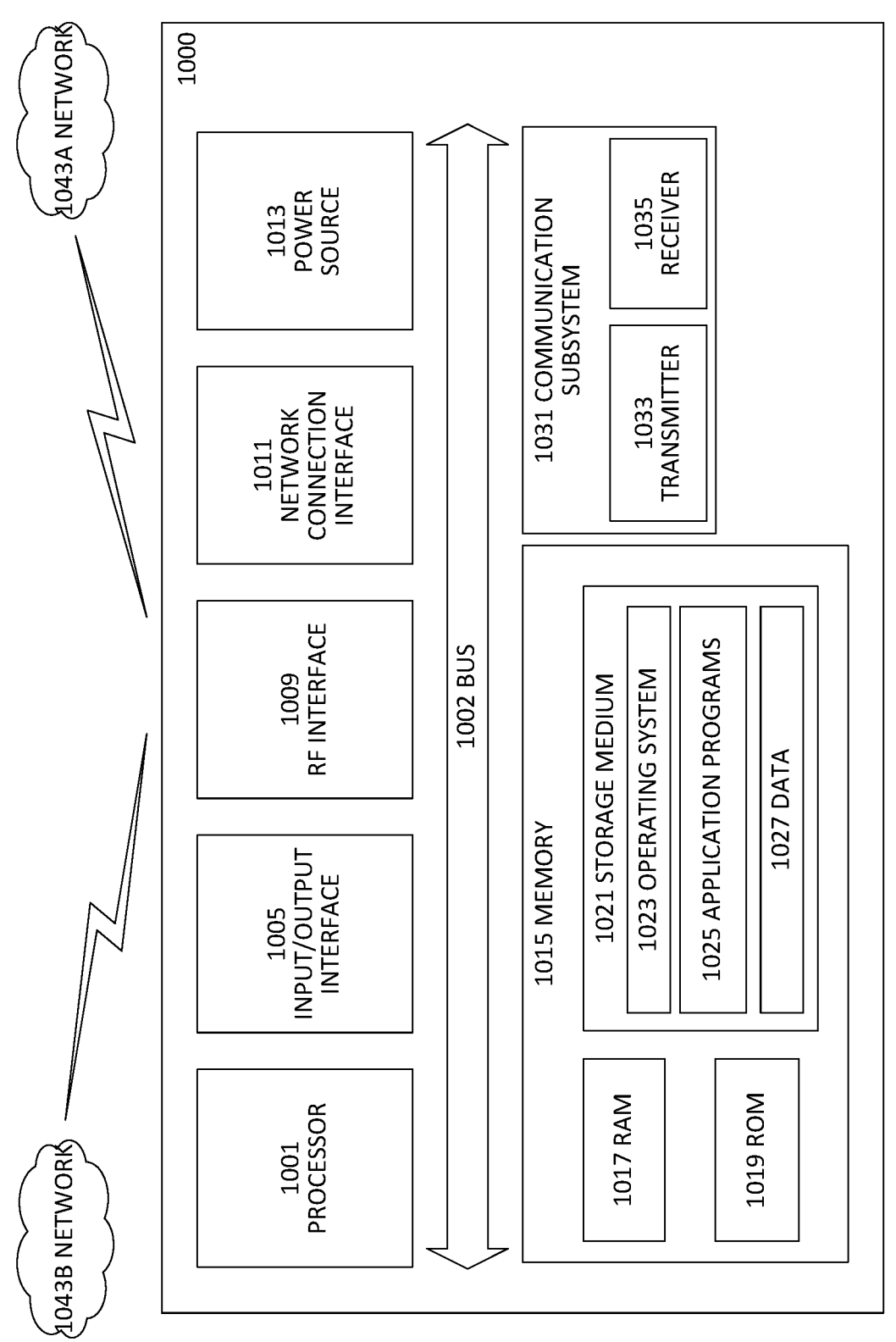
FIG. 10 is a block diagram of a user equipment according to some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the 3$^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043*a*. Network 1043*a* may encompass wired and/or wireless networks such as a local-area network (LAN), a wide-area network (WAN), a computer network, a wireless network, a telecommunications network, another like network or any combination thereof. For example, network 1043*a* may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043*b* using communication subsystem 1031. Network 1043*a* and network 1043*b* may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
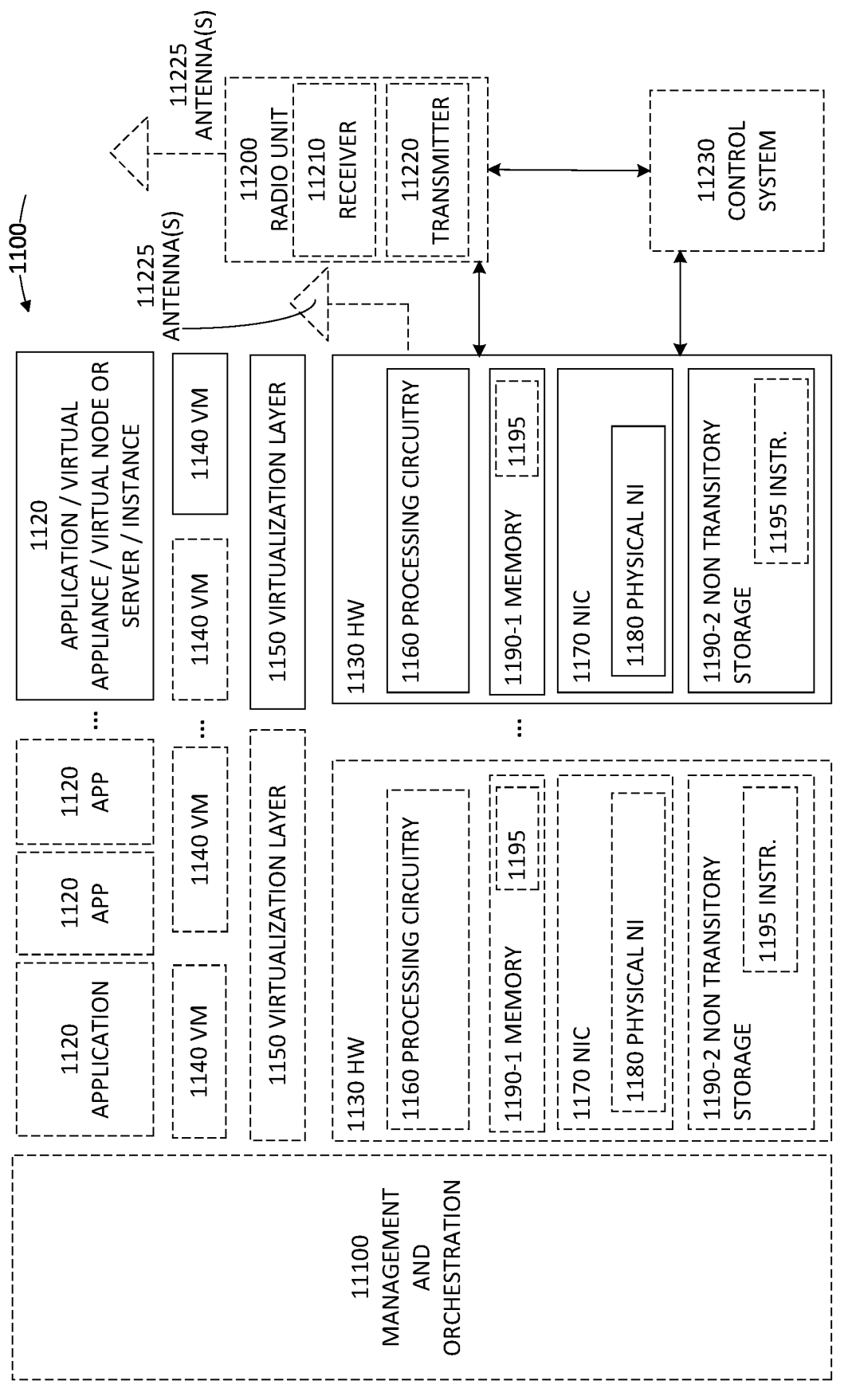
FIG. 11 is a block diagram of a virtualization environment according to some embodiments.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by an enterprise entitlement server dedicated to an enterprise or common to multiple enterprises, the method comprising:
   retrieving, from an authorization server in the form of an OAuth server and controlled by an enterprise, authorization data that indicates to which one or more resources a subject of the enterprise is entitled to subscribe and/or that indicates which one or more types of subscription management actions the subject is authorized to perform, wherein the authorization data is retrieved from the authorization server by the enterprise entitlement server as deployed on an enterprise communication platform in a mobile network that provides and/or controls an access network for the enterprise, and wherein the one or more types of subscription management actions include deletion of a subscription for the subject; and
   controlling, by the enterprise entitlement server, management of the subscription for the subject in accordance with the authorization data from the authorization server, wherein said controlling comprises controlling deletion of a Subscriber Identity Module (SIM) profile of the subscription upon receipt of a request from the subject to delete the SIM profile if the authorization data indicates that subscription deletion is authorized.

2. The method of claim 1, further comprising obtaining one or more entitlement plans specific to the enterprise, wherein each entitlement plan is associated with one or more resources, wherein the authorization data indicates to which one or more resources a subject of the enterprise is entitled to subscribe by indicating to which entitlement plan the subject is entitled.

3. The method of claim 2, further comprising obtaining a mapping of which classes of subjects of the enterprise are entitled to which one or more entitlement plans, and wherein the authorization data indicates to which entitlement plan the subject is entitled by indicating to which one or more classes the subject belongs.

4. The method of claim 2, further comprising:
   obtaining, for each entitlement plan, one or more attributes required of any given subject in order for the given subject to be entitled to the entitlement plan;
   determining an entitlement plan to which the subject is entitled according to the authorization data; and
   enforcing a requirement that the subject have the one or more attributes obtained for the determined entitlement plan.

5. The method of claim 1, wherein controlling management of a subscription for the subject further comprises:
   controlling provisioning of the subscription for the subject that entitles the subject to the one or more resources indicated by the authorization data.

6. The method of claim 5, wherein controlling provisioning of a subscription for the subject comprises:
   requesting a profile management server to generate a profile of a subscription that entitles the subject to the one or more resources indicated by the authorization data; and
   triggering the subject to obtain subscription profile from the profile management server.

7. The method of claim 1, further comprising controlling provisioning of the one or more resources to which the subject is entitled.

8. The method of claim 1, wherein the one or more types of subscription management actions further include one or more of:
   provisioning of a subscription for the subject; or
   modifying a subscription for the subject.

9. The method of claim 1, wherein the resources include resources of the access network that is provided by and/or controlled by a mobile network operator of the mobile network, wherein the enterprise entitlement server is configured to provide enterprise-specific entitlement services for one or more enterprises, wherein the enterprise entitlement server is configured to provide entitlement services for entitlement to the resources of any of multiple mobile network operators, and wherein the subject is a device or a user.

10. A method performed by an enterprise authorization server in the form of an OAuth server controlled by an enterprise, the method comprising:
   generating authorization data for a subject associated with the enterprise, wherein the authorization data indicates to which one or more resources the subject is entitled to subscribe and/or indicates which one or more types of subscription management actions the subject is authorized to perform, and wherein the one or more types of subscription management actions include deletion of a subscription for the subject; and sending the authorization data to an enterprise entitlement server deployed on an enterprise communication platform in a mobile network that provides and/or controls an access network for the enterprise, wherein the enterprise communication platform is dedicated to the enterprise or common to multiple enterprises, and wherein sending the authorization data enables the enterprise entitlement server to control deletion of a Subscriber Identity Module (SIM) profile of the subscription upon receipt of a request from the subject to delete the SIM profile if the authorization data indicates that subscription deletion is authorized.

11. The method of claim 10, wherein the authorization data indicates to which one or more resources the subject is entitled to subscribe.

12. The method of claim 11, wherein the authorization data indicates to which one or more resources the subject is entitled to subscribe by indicating to which entitlement plan the subject is entitled, wherein the entitlement plan is associated with the one or more resources.

13. The method of claim 12, wherein the authorization data explicitly indicates to which entitlement plan the subject is entitled.

14. The method of claim 12, wherein the authorization data indicates to which entitlement plan the subject is entitled by indicating to which one or more classes the subject belongs, wherein different classes of subjects of the enterprise are entitled to one or more respective entitlement plans.

15. The method of claim 10, wherein the authorization data indicates which one or more types of subscription management actions the subject is authorized to perform.

16. The method of claim 10, wherein the one or more types of subscription management actions further include one or more of:

provisioning of a subscription for the subject; or modifying a subscription for the subject.

17. The method of claim 10, wherein the resources include resources of an access network that is provided by and/or controlled by a mobile network operator, or include resources of a service network that is provided by and/or controlled by the enterprise, wherein the enterprise entitlement server is configured to provide enterprise-specific entitlement services for one or more enterprises, and wherein the subject is a device or a user.

18. The method of claim 10, further comprising configuring a subscription profile management server with a range of subscription identifiers specific to the enterprise and/or with a range of integrated circuit card identifiers specific to the enterprise.

19. An enterprise entitlement server dedicated to an enterprise or common to multiple enterprises, the enterprise entitlement server comprising:

communication circuitry; and processing circuitry configured to:

retrieve, from an authorization server in the form of an OAuth server and controlled by an enterprise, authorization data that indicates to which one or more resources a subject of the enterprise is entitled to subscribe and/or that indicates which one or more types of subscription management actions the subject is authorized to perform, wherein the enterprise entitlement server is configured to be deployed on an enterprise communication platform in a mobile network that provides and/or controls an access network for the enterprise, and wherein the one or more types of subscription management actions include deletion of a subscription for the subject; and control management of the subscription for the subject in accordance with the authorization data from the authorization server, wherein the processing circuitry is configured to control management of the subscription by controlling deletion of a Subscriber Identity Module (SIM) profile of the subscription upon receipt of a request from the subject to delete the SIM profile if the authorization data indicates that subscription deletion is authorized.

20. An enterprise authorization server in the form of an OAuth server controlled by an enterprise, the enterprise authorization server comprising:

communication circuitry; and processing circuitry configured to:

generate authorization data for a subject associated with an enterprise, wherein the authorization data indicates to which one or more resources the subject is entitled to subscribe and/or indicates which one or more types of subscription management actions the subject is authorized to perform, and wherein the one or more types of subscription management actions include deletion of a subscription for the subject; and send the authorization data to an enterprise entitlement server deployed on an enterprise communication platform in a mobile network that provides and/or controls an access network for the enterprise, wherein the enterprise communication platform is dedicated to the enterprise or common to multiple enterprises, and wherein the processing circuitry is configured to send the authorization data to enable the enterprise entitlement server to control deletion of a Subscriber Identity Module (SIM) profile of the subscription upon receipt of a request from the subject to delete the SIM profile if the authorization data indicates that subscription deletion is authorized.

* * * * *